March 3, 1931. K. A. BERBERIAN 1,795,104
PUNCTUREPROOF VEHICLE TIRE
Filed Jan. 20, 1928
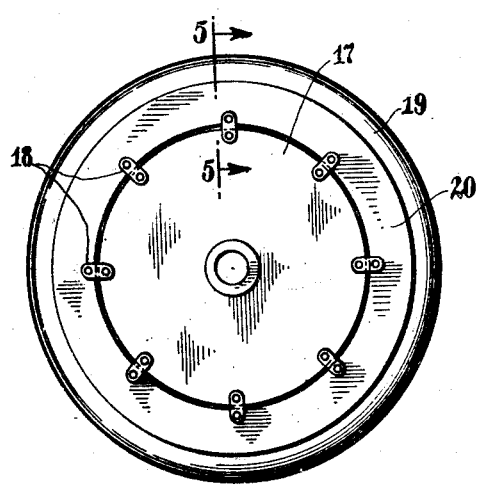
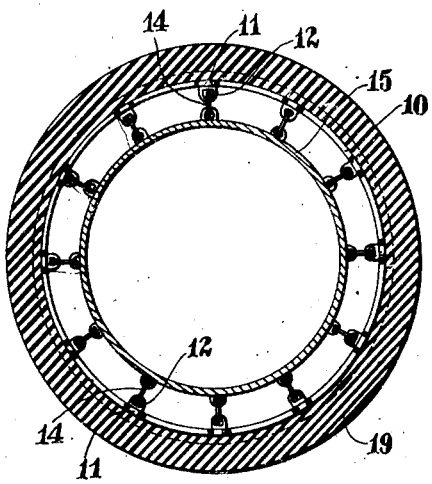
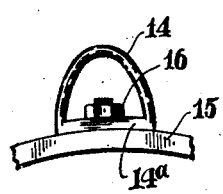
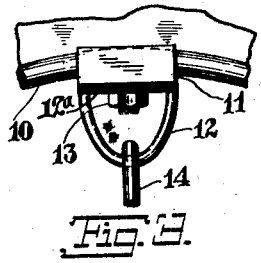
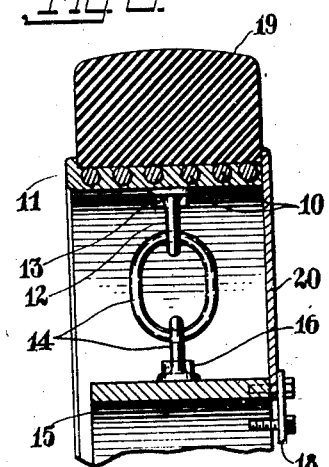
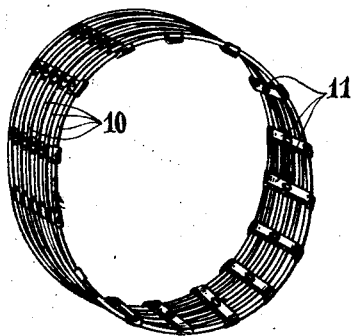
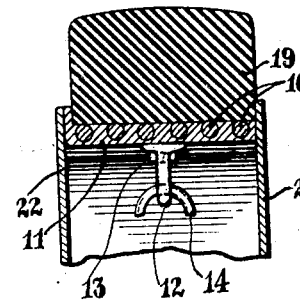
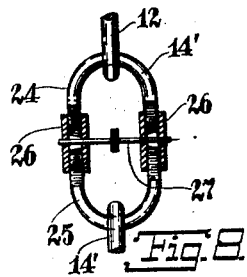
INVENTOR
*Krikor A. Berberien*
BY
ATTORNEY Patented Mar. 3, 1931

1,795,104

UNITED STATES PATENT OFFICE

KRIKOR A. BERBERIAN, OF RICHFIELD PARK, NEW JERSEY

PUNCTUREPROOF VEHICLE TIRE

Application filed January 20, 1928. Serial No. 248,066.

This invention relates generally to vehicle tires, and has more particular reference to a novel puncture proof vehicle tire.

The invention has for an object the provision of a device of the class mentioned which is of simple, durable construction, desirable and efficient in action, and which can be manufactured and sold at a reasonable cost.

The device consists of a solid rubber shoe mounted on a plurality of wire rings to which a plurality of spaced brackets are secured. A chain structure is connected to each of these brackets, and the remote ends of the chains are attached to a rim adapted to be connected with the wheels of a vehicle, which may be of the disc type or the spoke type.

For further comprehension of the invention, and of the objects and advantages thereof, reference will be had to the following description and accompanying drawings, and to the appended claim in which the various novel features of the invention are more particularly set forth.

Referring to the accompanying drawing, forming a material part of this disclosure:—

Fig. 1 is a side view of a vehicle wheel provided with a puncture proof tire constructed according to this invention.

Fig. 2 is a side view of the tire, per se, with the side cover ring removed.

Fig. 3 is a fragmentary enlarged view of the outer portion of the chain structure, as seen in Fig. 2.

Fig. 4 is a fragmentary enlarged view of the inner portion of the chain structure, as seen in Fig. 2.

Fig. 5 is a transverse vertical sectional view of the tire, taken on the line 5—5 of Fig. 1.

Fig. 6 is a perspective view of the spaced wire rings and attached brackets, as used in the device.

Fig. 7 is a view similar to Fig. 5, but of modified construction.

Fig. 8 is a fragmentary detailed view of the chain structure of a construction modified from that shown in Fig. 5.

The reference numeral 10 indicates a plurality of spaced wire rings held in spaced relation by brackets 11 attached at various places along the inner sides of the rings. The method of attachment may be by welding. A chain link 12 is secured to each of the brackets 11, by means of studs and bolts 13. Chain structures 14 connect with each of the links 12, and the remote ends of these chain structures are attached to a rim 15, by studs and bolts 16. The link 12 has a web portion 12ª arranged for fitting against the bracket 11, and the remote link 14 also has a web portion 14ª arranged for fitting against the rim 15. These web portions are firmly held in place against the parts mentioned by the studs and nuts before recited.

The rim 15 is adapted to engage a vehicle wheel 17, and links 18 bolted to the rim 15 and wheel 17 hold the parts against displacement. A solid rubber tire shoe 19 is forced upon the wire rings 10 and a side cover ring 20 extends from the shoe 19 to the rim 15, and is held in place by the bolts holding the links 18.

In operation, the vehicle hangs from the upper portion of the tire, while the lower portion of the tire rests upon the ground. As the wheel turns and runs over irregularities on a road, a shock, jar, rise or a fall is first communicated to the lower portion of the tire, then transmitted to the upper portion, and finally to the vehicle, itself. The shock, of course is highly damped before reaching the vehicle, because of the shoe 19, and wire rings 10, which have shock absorbing qualities.

The modified form shown in Fig. 7, shows additional plate 22 held on the inner side of the tire.

The modification shown in Fig. 8 discloses an adjustable chain structure 14′, as a means for changing the tensional stress between the wire rings 10 and the rim 15. One of the links of the chain consists of a U-member 24 and an inverted U-member 25, having their opposite arms formed with opposite hand threads, and collars 26 threadedly engage the threads, so that the collars may be turned to adjust the distance between the U-members. A wire 27 engages the collars to lock them against vibrational rotation.

While I have shown and described a preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

In a puncture proof tire, an annular rim constructed of a plurality of wire rings for supporting a solid tire shoe, spaced bracket members secured to the inner circumference of said rings for maintaining them in spaced relation, said brackets being upturned at one of their ends to engage the walls of a solid tire shoe, an inner tire rim of smaller diameter than that of said wire rings, attachment members secured to said inner rim and to said brackets, and chain links connecting the attachment members on the bracket with the corresponding attachment members on the inner rim, whereby bending stresses from the chains are transmitted to all of the wire rings simultaneously and equally.

In testimony whereof I have affixed my signature.

KRIKOR A. BERBERIAN.